United States Patent [19]
Anton et al.

[11] Patent Number: 6,005,023
[45] Date of Patent: *Dec. 21, 1999

[54] INK JET INKS CONTAINING BRANCHED POLYMER DISPERSANTS AND EMULSION POLYMER ADDITIVES

[75] Inventors: Waifong Liew Anton; Milan Bohuslav Bednarek, both of Wilmington, Del.; Soodabeh Tronson, San Carlos, Calif.

[73] Assignee: E.I. du Pont Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/774,987

[22] Filed: Dec. 27, 1996

[51] Int. Cl.⁶ .................................................. C09D 11/10
[52] U.S. Cl. ................................. 523/161; 260/DIG. 38; 524/501; 524/504; 523/201; 106/31.13; 106/31.25
[58] Field of Search ...................................... 523/161, 201; 106/20 D, 31.13, 31.25; 260/DIG. 38; 524/501, 504

[56] References Cited

U.S. PATENT DOCUMENTS

| | | | |
|---|---|---|---|
| 5,021,469 | 6/1991 | Langerbeins et al. | 523/201 |
| 5,085,698 | 2/1992 | Ma et al. | 106/20 D |
| 5,212,251 | 5/1993 | Lorah et al. | 525/279 |
| 5,656,071 | 8/1997 | Kappele et al. | 106/31.76 |

FOREIGN PATENT DOCUMENTS

| | | | |
|---|---|---|---|
| 0 556 649 A1 | 8/1993 | European Pat. Off. | |
| 0 571 190 A2 | 11/1993 | European Pat. Off. | |
| 0 722 994 A1 | 7/1996 | European Pat. Off. | |
| 62-273274 | of 1987 | Japan. | |
| 3-79679 | 4/1991 | Japan | C09D 11/00 |
| 4-275315 | 9/1992 | Japan | C08F 257/00 |

*Primary Examiner*—Terrel Morris
*Assistant Examiner*—John J. Guarriello
*Attorney, Agent, or Firm*—Joseph A. Tessari

[57] ABSTRACT

An ink for ink jet printers contains an aqueous carrier medium; a colorant that is insoluble in the aqueous carrier; a branched polymer dispersant; and an emulsion polymer additive and is stable, has low viscosity, exhibits excellent print quality, provides excellent smear resistance after drying and has good decap or crusting time.

12 Claims, No Drawings

INK JET INKS CONTAINING BRANCHED POLYMER DISPERSANTS AND EMULSION POLYMER ADDITIVES

BACKGROUND OF THE INVENTION

This invention relates to aqueous inks for ink jet printers, and more particularly, to aqueous ink jet inks containing structured polymer dispersants and emulsion polymer additives to improve smear resistance of the applied ink.

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers. Both dyes and pigments have been used as ink colorants for ink jet printers. The dye-based inks while in general superior in color properties, have several disadvantages as compared to pigment based inks. The dyes are usually water soluble and remain so after drying on the substrate. They are easily redissolved by water spills, and the image smears on contact with felt pen markers. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

Polymeric additives may be added to the pigmented inks to further improve their resistance to smear/smudge or general handling. However, such additives have a great tendency towards generating problems for the ink jet printing process. The most common ones include 1). aggravating the pigment dispersion stability; 2). building up solids around the nozzle plate resulting in misdirection of the ink drop or complete blockage of the ink delivery; and 3). interfering with the ink drop generation, especially in the bubble formation in a thermal ink jet device.

There exists a need for ink jet inks which have good water resistance and smear fastness. In particular, with inks containing insoluble (i.e., dispersed) colorants, there is a need to maintain the stability of the dispersion and pen reliability while improving water and smear fastness.

SUMMARY OF THE INVENTION

The present invention provides an ink jet ink comprising:
(a) an aqueous carrier medium;
(b) an aqueous carrier medium insoluble colorant;
(c) a branched polymer dispersant; and
(d) an emulsion polymer additive.

The inks of the invention are stable, have low viscosity, exhibit excellent print quality, provide excellent smear resistance after drying and good decap or crusting time. They may be used with a variety of ink jet printers such as continuous, piezoelectric drop-on-demand and thermal or bubble jet drop-on-demand, and are particularly adapted for use in thermal ink jet printers. These inks may also be useful in air brush printing devices.

DETAILED DESCRIPTION OF THE INVENTION

The invention provides an ink jet ink composition which is particularly suited for use in ink jet printers in general, and thermal ink jet printers in particular. Essentially, the ink composition comprises an aqueous carrier medium, a colorant that is insoluble in the aqueous medium, a branched polymer dispersant and an emulsion polymer additive. These inks are stable over long periods, both in storage and in the printer. The inks may be adapted to the requirements of a particular ink jet printer to provide a balance of light stability, smear resistance, viscosity, surface tension, high optical density, and crust resistance.

Aqueous Carrier Medium

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, by weight, water. The aqueous carrier medium comprises 60 to 99.8%, by weight of the total ink composition, depending on the type of colorant selected. Preferably, the aqueous carrier medium comprises 94–99.8% when an organic pigment is selected; 70 to 99.8% when an inorganic pigment is selected; and 80 to 99.8% when a dye is selected.

Colorants

The colorant is either a dye or a pigment that is insoluble in the aqueous carrier medium. By the term "dye" we mean a colorant that becomes soluble at some point during the printing process. By "pigment" we mean a colorant that is insoluble (i.e., in particulate or crystalline form) throughout the printing process. Pigments are the preferred colorants for use in the compositions of this invention.

Pigments

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Dyes

The color and amount of dye present in the ink composition is largely a function of choice, being primarily dependent upon the desired color of the print achieved with the ink, the purity of the dye and its strength. Low concentrations of dye may not give adequate color vividness whereas high concentrations may result in poor printhead performance or unacceptably dark colors. Generally, the dye will be present in the amount of 0.01 to 20%, preferably 0.05 to 8%, and most preferably 1 to 5%, by weight, based on the total weight of the ink composition.

Branched Polymer Dispersant

The branched polymer dispersants suitable for use in this invention are those which have both hydrophobic and hydrophilic portions and which have a weight average molecular weight of 5,000–100,000.

Particularly preferred are graft copolymers and, more specifically, a graft copolymer having a polymeric backbone and macromonomer side chains attached to the backbone, wherein (1) the polymeric backbone is hydrophobic in comparison to the side chains and contains polymerized ethylenically unsaturated hydrophobic monomers and up to 20% by weight, based on the weight of the graft copolymer, of polymerized ethylenically unsaturated acid containing monomers; and (2) the sidechains are hydrophilic macromonomers attached to the backbone at a single terminal point and contain polymerized ethylenically unsaturated monomers and 2–100% by weight, based on the weight of the macromonomer, of polymerized ethylenically unsaturated acid containing monomers and have a weight average molecular weight of about 1,000–30,000 and wherein the acid groups of the graft copolymer are neutralized with an inorganic base or an amine.

In one specific embodiment, the graft copolymer contains about 50–90% by weight of polymeric backbone and correspondingly about 10–50% by weight of sidechains. The graft copolymer has a weight average molecular weight of about 5,000–100,000 and preferably about 10,000–40,000. The side chains of the graft copolymer are formed from hydrophilic macromonomers that have a weight average molecular weight of about 1,000–30,000 and preferably 2,000–5,000 and contain about 2–100% and preferably 20–50% by weight, based on the weight of the macromonomer, of polymerized ethylenically unsaturated acid monomers. These sidechains are hydrophilic and keep the dispersant and colorants uniformly dispersed in the aqueous carrier medium.

The backbone of these graft copolymer is hydrophobic relative to the sidechains and may contain up to 20%, preferably 1–10% by weight, based on the weight of the graft copolymer, of polymerized ethylenically unsaturated acid monomers.

The backbone contains polymerized hydrophobic monomers such as alkyl methacrylates and acrylates, cycloaliphatic methacrylates and acrylates and aryl methacrylates and acrylates and also may contain up to 30% by weight, based on the weight of the graft copolymer, of polymerized ethylenically unsaturated hydrophylic monomers which may contain functional groups.

Typical alkyl methacrylates that can be used have 1–8 carbon atoms in the alkyl group and are for example methyl methacrylate, ethyl methacrylate, propyl methacrylate, isopropyl methacrylate, butyl methacrylate, pentyl methacrylate, hexyl methacrylate, 2-ethyl hexyl methacrylate and the like. Cycloaliphatic methacrylates also can be used such as trimethylcyclohexyl methacrylate, isobutylcyclohexyl methacrylate, and the like. Aryl methacrylates also can be used such as benzyl methacrylate. Other polymerizable monomers that can be used are styrene, alpha methyl styrene, methacrylamide and methacrylonitrile.

Examples of ethylenically unsaturated non-hydrophobic monomers which contain functional groups are hydroxy ethyl acrylate, hydroxy ethyl methacrylate, t- butylamino ethyl methacrylate, diethyl amino ethyl acrylate, diethyl amino ethyl methacrylate, acrylamide, nitro phenol acrylate, nitro phenol methacrylate, phthalimido methyl acrylate, phthalimido methacrylate, acrylic acid, acrylamindo propane sulfonic acid.

The macromonomer side chains may contain a single terminal ethylenically unsaturated group which is polymerized into the backbone of the graft copolymer and primarily contains polymerized monomers of methacrylic acid, its esters, nitriles, amides or mixtures of these monomers. Because the backbone of the graft copolymer is relatively hydrophobic, it has an affinity for the surface of the colorant used in the dispersion and anchors the copolymer to the colorant and keeps the colorant dispersed and prevents the graft copolymer from returning to the aqueous phase. Reactive groups on the backbone can react with the colorant and form a bond therewith.

The macromonomer may contain 2–100% by weight, preferably about 20–50% by weight, based on the weight of the macromonomer, of polymerized ethylenically unsaturated acid. Methacrylic acid is preferred particularly if it is the sole constituent. Other acids that may be used are ethylenically unsaturated carboxylic acids such as acrylic acid, itaconic acid, maleic acid and the like. Ethylenically unsaturated sulfonic, sulfinic, phosphoric or phosphonic acid and esters thereof also may be used such as styrene sulfonic acid, acrylamido methyl propane sulfonic acid, vinyl phosphonic acid and its esters and the like.

Up to 40% by weight, based on the weight of the macromonomer, of other polymerized ethylenically unsaturated monomers may be present in the macromonomer. Primarily alkyl acrylates having 1–12 carbons in the alkyl group can be used such as methyl acrylate, ethyl acrylate, propyl acrylate, isopropyl acrylate, butyl acrylate, pentyl acrylate, hexyl acrylate, 2-ethyl acrylate, nonyl acrylate, lauryl acrylate and the like can be used. Cycloaliphatic acrylates can be used such as trimethylcyclohexyl acrylate, t-butyl cyclohexyl acrylate and the like. Aryl acrylates such as benzyl acrylate also can be used.

One preferred macromonomer contains about 50–80% by weight of polymerized methyl methacrylate, 20–50% by weight of polymerized methacrylic acid and has a weight average molecular weight of about 2,000–5,000.

To ensure that the resulting macromonomer only has one terminal ethylenically unsaturated group which will polymerize with the backbone monomers to form the graft copolymer, the macromonomer is polymerized by using a catalytic chain transfer agent that contains $Co^{+2}$ group, i.e., a cobalt chain transfer agent. Typically, in the first step of the process for preparing the macromonomer, the monomers are blended with a cobalt chain transfer agent and an inert organic solvent which is water miscible or water dispersible. The mixture is then heated, usually to the reflux temperature of the reaction mixture. In subsequent steps, additional monomers and cobalt catalyst and conventional azo-type polymerization catalyst, such as 2,2'-azobis(2-methylbutanenitrile) and 2,2'-azobis(2,4'-dimethylpentanenitrile) 2,2'-azobis(2,4-dimethyl-4-methoxyvaleronitrile), are added and polymerization is continued until a macromonomer is formed of the desired molecular weight.

Preferred cobalt chain transfer agents or catalysts are described in U.S. Pat. Nos. 4,680,352 and 4,722,984. Most preferred are pentacyanocobaltate (II), diaquabis (borondifluorodimethyl-glyoximate) cobaltate(II) and diaquabis(borondifluorophenylglyoximate) cobaltate (II). Typically these chain transfer agents are used at concentrations of about 5–1000 ppm based on the monomers used.

After the macromonomer is formed as described above, optionally solvent is stripped off and the backbone monomers are added to the macromonomer along with additional solvent and polymerization catalyst. Any of the aforementioned azo-type catalyst can be used, as can other suitable catalyst such as peroxides and hydroperoxides. Typical of such catalyst are di-tertiarybutyl peroxide, di-cumylperoxide, tertiaryamyl peroxide, cumenehydroperoxide, di(n-propyl) peroxy-dicarbonate, peresters such as amyl peroxyacetate, and the like. Polymerization is continued usually at the reflux temperature of the reaction mixture until a graft copolymer is formed of the desired molecular weight.

Typical solvents that can be used to form the macromonomer or the graft copolymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol mono butyl ether, and the like.

After the graft copolymer is formed, the acid groups are neutralized with an amine or an inorganic base and then water is added to form a dispersion. Typical amines that can be used include amino methyl propanol, amino ethyl propanol, dimethyl ethanol amine, triethylamine and the like, with the preferred amine being amino methly propanol. Typical inorganic bases that can be used to neutralize the acid groups include ammonium hydroxide or sodium hydroxide and the preferred inorganic base is ammonium hydroxide. Suitable graft copolymers and their process of preparation are disclosed in U.S. Pat. No. 5,231,131. Other useful graft polymers are disclosed in copending and commonly assigned U.S. patent application Ser. Nos. 08/706,416 (IM-1084) and 08/706,420 (IM-1077), both filed Aug. 30, 1996.

The amount of the polymeric dispersant used in the ink composition depends on the structure, molecular weight and other properties of the polymer, and on the other components of the ink composition. Generally, the polymeric dispersant will be present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Emulsion Polymer Additive

The emulsion polymer additive may be prepared from acrylic or methacrylic monomers; vinyl type monomers such as vinyl acetate, vinyl chloride, etc.; maleic acid or maleic anhydride; styrene; itaconic acid; N-vinyl pyrrolidone; acrylamides; methacrylamides; and derivatives thereof. Some representative acrylic or methacrylic monomers include methyl methacrylate, ethyl methacrylate, propyl methacrylate, n-butyl methacrylate, hexyl methacrylate, 2-ethylhexyl methacrylate, octyl methacrylate, lauryl methacrylate, stearyl methacrylate, phenyl methacrylate, hydroxyethyl methacrylate, hydroxypropyl methacrylate, ethoxytriethyleneglycol methacrylate, 2-ethoxyethyl methacrylate, methacrylonitrile, 2-trimethylsiloxyethyl methacrylate, glycidyl methacrylate, zonyl fluoromethacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate acrylonitrile, 2-trimethyl- siloxyethyl acrylate, glycidyl acrylate, p-tolyl acrylate, sorbyl acrylate, methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Preferred are emulsions polymers prepared from methyl methacrylate, butyl methacrylate, 2-ethylhexyl methacrylate, methyl methacrylate with butyl methacrylate, methacrylic acid or dimethylaminoethyl methacrylate.

The emulsion polymer may also contain small amounts of crosslinking monomers like ethylene glycol dimethacrylate or ethylene glycol triacrylate, etc. In addition, the emulsion polymer may also contain hydrophilic monomers of the general formula:

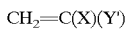

$$CH_2=C(X)(Y')$$

wherein X is H or $CH_3$ and Y' is $C(O)OH$, $C(O)NR_2R_3$, $C(O)OR_4NR_2R_3$, $C(O)OR_5$, or their salts, wherein $R_2$ and $R_3$ may independently be H or $C_1$ to $C_9$ alkyl, aryl, or alkylaryl, $R_4$ is a $C_1$ to $C_5$ alkyl diradical, and $R_5$ is a $C_1$ to $C_{20}$ alkyl diradical which may contain hydroxy or ether groups, to provide some changes in solubility. However, there should not be enough hydrophilic monomer present in the emulsion polymer to render it, or its salt, completely water soluble.

The emulsion polymer may be stabilized with monomeric or polymeric stabilizers. Some useful monomeric stabilizers include N,N,N-trimethyl-1-dodecaninium chloride, di-methyl-dodecaninium chloride, polyethyleneglycol derivatives of alkyl phenols, sodium lauryl sulfate and N-alkyl trimethylammonium chlorides. The monomeric stabilizers are commercially available under the tradenames Arquad® manufactured by Akzo Chemicals Inc., Chicago, Ill. Some useful polymeric stabilizers include structured polymers selected from the group consisting of block polymers (such as diblock and triblock polymers) and graft polymers. Useful diblock polymers are disclosed in U.S. Pat. No. 5,085,698 and useful triblock polymers are disclosed in U.S. Pat. No. 5,519,085. Some useful graft polymers are disclosed in U.S. Pat. No. 5,231,131.

The emulsion polymer additive may be present in the amount of 0.01 to 20% solids by weight, preferably 0.1 to 5% solids by weight for thermal ink jet applications and 5.1 to 20% solids by weight for continuous flow ink jet applications, based on the total weight of the ink composition.

Other Ingredients

Consistent with the requirements of the invention, various types of additives may be used to optimize the properties of the ink compositions for specific applications. Surfactants may be used to alter surface tension as well as maximize penetration. However, the type of surfactants and the amounts used need to be carefully selected to avoid pigment dispersion destabilization or to negate the benefits of the present inks.

As is well known to those skilled in the art, biocides may be used in the ink compositions to inhibit growth of microorganisms. Sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions as desired.

Ink Properties And Preparation

The inks are prepared by premixing the selected colorants and dispersant in the aqueous carrier medium and then dispersing or deflocculating the colorant. This step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the colorant in the aqueous carrier medium.

It is generally desirable to make ink jet inks in concentrated form to maximize the efficiency of the manufacturing process and equipment. The concentrated ink jet inks are subsequently diluted to the appropriate concentration for use in the ink jet printing system by adding water and/or appropriate solvents. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately.

EXAMPLES

The invention will now be further illustrated by, but not limited to, the following examples, in which parts and percentages are by weight unless otherwise noted.

Emulsion Stabilizer

A 12 liter flask was equipped with a stirrer, thermometer, N2 inlet, drying tube outlet and addition funnels. Tetrahydrofuran ("THF"), 3004 g, and mesitylene, 7.6 g were charged to the flask. The catalyst, tetrabutyl ammonium m-chlorobenzoate, 3.0 ml of a 1.0 M solution in acetonitrile, was then added. The initiator, 1,1-bis(trimethylsiloxy)-2-methylpropene, 240 g, was injected. Feed I (tetrabutyl ammonium m-chlorobenzoate, 3.0 ml, of a 1.0 M solution in acetonitrile) was started and added over 150 minutes. Feed II (trimethylsilyl methacrylate, 1636 g) was started at 0.0 min and added over 30 minutes. Fifty minutes after Feed II was completed, Feed III (butyl methacrylate, 1469 g and ethoxytriethyleneglycol methacrylate, 1274 g) was started and added over 30 minutes. At 320 minutes, 663 g of dry methanol were added to the above solution and distillation was started. During the first stage of distillation 624.0 g of material were removed from the flask. Methanol, 332 g, was added. Distillation continued and a total of 1239 g of solvent were removed.

This made an emulsion stabilizer comprising butyl methacrylate/ ethoxytriethyleneglycol methacrylate// methacrylic acid AB block polymer (5/10//10) of 5140 Mn and 50.8% solids. 701 g of the polymer were neutralized with 127 g of KOH (45% solution) and the solution was diluted with 2673 g of deionized water.

Emulsion Polymer

An emulsion polymer of BMA/ETEGMA (20/80) stabilized with 10% Emulsion Stabilizer and 1% of butylmercaptan chain transfer agent was prepared according to the following procedure.

A pre-emulsified mixture was prepared by mixing BMA (100.0 g), ETEGMA (400.0 g), Butylmercaptan (5.0 g) 2 pyrrolidone (65.0 g), Liponic® EG-1 (35.0 g), Emulsion Stabilizer (390.3 g), and water (359.68 g). The mixture was first mixed slowly and then mixed for twenty minutes on a high speed homogenizer.

557.5 g of deionized water, 67.5 g of 2-pyrrolidone and 35.0 g of Liponic® EG-1 (Lipo Chemical) were added to a resin kettle equipped with a heating mantle, stirrer, $N_2$ inlet thermometer, condenser and addition funnel. The pot was heated to 70° C.

Feed I Pre-emulsified mixture (1255.0 g)

Feed II D.I. water (50.0 g), Sodium Bisulfite (0.675 g)

Feed III D.I. water (15.75 g), Ammonium Persulfate (1.175 g)

Feed IV D.I. water (15.75 g), Ammonium Persulfate (0.25 g)

10% of Feed I, 10% of Feed II, all of Feed III were added to the pot over 1 minute. The remaining 90% of Feed I and 90% of Feed II were fed into the pot over 75 minutes. Approximately halfway during this step ⅓ of Feed IV was added. After the completion of Feed I and Feed II, an additional ⅓ of the Feed IV was added. The reaction was continued for 15 minutes, and the remaining ⅓ of the Feed IV was added. The reaction was continued for additional 120 minutes, the mixture was cooled and filtered.

Dispersant

Preparation of graft copolymer dispersant 2-phenoxyethyl acrylate-co-methyl methacrylate-g-ethoxytriethyleneglycol methacrylate-co-methacrylic acid, 56.9/19.8//2.9/20.4 by weight.

Step A

Preparation of macromonomer ethoxytriethyleneglycol methacrylate-co-methacrylic acid, 12.5/87.5 by weight

| Ingredient | Amount (grams) |
|---|---|
| Portion 1: | |
| isopropanol | 453.5 |
| acetone | 152.0 |
| Portion 2: | |
| methacrylic acid monomer | 360.5 |
| ethoxytriethyleneglycol methacrylate monomer | 52.2 |
| Portion 3: | |
| Diaquabis (borondifluorodiphenyl glyoximato) cobaltate (II), Co(DPG-BF2) | 0.31 |
| 2,2'-azobis(2,2-dimethylvaleronitrile), (Vazo ® 52 by DuPont Co., Wilmington, DE) | 11.86 |
| acetone | 150.0 |

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. Portions 2 and 3 were simultaneously added while the reaction mixture was held at the reflux temperature of about 70–71° C. The addition of Portion 2 was completed in 4 hours and the addition of Portion 3 was completed in 4½ hours. Reflux was continued for another 2½ hours and the solution was cooled to room temperature.

The resulting macromonomer solution was a clear thin polymer solution and had a solid content of about 32.2%. The macromonomer contained 12.5% of ethoxytriethyleneglycol methacrylate and 87.5% of methacrylic acid and had a weight average molecular weight of 3,350 and a number average molecular weight of 2,570 as measured by Gel Permeation Chromatography (GPC) on a methylated macromonomer sample using polymethyl methacrylate as the standard.

Step B
Preparation of a graft copolymer from the macromonomer of Step A

| Ingredient | Amount (grams) |
|---|---|
| Portion 1: | |
| Macromonomer from Step A | 85.7 |
| 2-Pyrrolidone | 30.0 |
| Portion 2: | |
| t-butyl peroxypivalate (Lupersol ® 11, Elf Atochem, North America, Inc., Philadelphia, PA) | 0.75 |
| Acetone | 5.0 |
| Portion 3: | |
| 2-Phenoxyethyl acrylate | 73.2 |
| Methyl methacrylate | 25.5 |
| Portion 4: | |
| Lupersol ® 11 | 3.0 |
| Acetone | 20.0 |
| Portion 5: | |
| Lupersol ® 11 | 0.75 |
| Acetone | 5.0 |

The Portion 1 mixture was charged into a 500 mL flask equipped with a thermometer, stirrer, additional funnels, reflux condenser and a means for maintaining a nitrogen blanket over the reaction mixture. The mixture was heated to the reflux temperature and refluxed for about 10 minutes. The Portion 2 solution was added. Subsequently, Portions 3 and 4 were simultaneously added while the reaction mixture was held at the reflux temperature. The addition of Portions 3 and 4 was completed in 3 hours. The reaction mixture was refluxed for 1 hour. The Portion 5 solution was added. The reaction mixture was refluxed at about 66° C. for an additional 2 hours. The mixture was distilled until about 74.5 g of volatiles were collected and 111.6 g of 2-pyrrolidone were added to yield 286.0 g of a 43.7% polymer solution.

This graft copolymer contains a random copolymer of 56.9% by weight of 2-phenoxyethyl acrylate and 19.8% by weight of methyl methacrylate in the backbone and a random copolymer of 2.9% by weight of ethoxytriethyleneglycol methacrylate and 20.4% by weight of methacrylic acid in the arms. The graft copolymer had a weight averaged molecular weight of 34,700 and a number averaged molecular weight of 14,900 as measured by Gel Permeation Chromatography (GPC) using a methylated polymer sample and polystyrene as the standard.

The graft copolymer was neutralized by mixing 429.1 g of the polymer with 55.0 g of potassium hydroxide solution (45.5% in deionized water) and 1390.9 g of deionized water until a homogeneous 10% polymer solution was obtained.

Pigment Dispersion

A black pigment dispersion was prepared using the following procedure:

| Ingredient | Amount (parts) |
|---|---|
| FW18, Carbon black pigment (Degussa Corp., Allendale, NJ) | 450 |
| Dispersant (10% solution) | 1,875 |
| Deionized water | 675 |

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times under a liquid pressure of about 8,000 psi. The resulting pigment dispersion had a 15% pigment concentration with an average particle size of 107 nm as determined by Brookhaven BI-90 particle sizer. The dispersion was filtered through a 1 micron high efficiency filter bag (3M Filtration Products, St Paul, Minn.). The final pH was 8.49.

Control and Example inks were prepared in which the Example ink had 1% of Emulsion Polymer solids added. The inks had the following compositions:

| | Amount (parts) | |
|---|---|---|
| Ingredient | Control | Example |
| Pigment Dispersion 2 | 20 | 20 |
| 2-pyrrolidone | 9 | 9 |
| Liponics ® EG-1, Lipo Chemical Co., Paterson, NJ | 5 | 5 |
| Deionized water | 66 | 66 |
| Emusion Polymer | — | 3.6 |

The inks were jetted out of a Hewlett Packard DeskJet Printer (Hewlett Packard, Palo Alto, Calif.) in a pattern of seven parallel ⅛ inch solid black lines, spaced ⅛ inch apart. Image quality and pen performance were excellent. The images were left 5 minutes and then marked twice with a commercial yellow highlighter pen. Black smear onto the non-imaged portions of the paper was evaluated subjectively on a scale of 1–5, where 1 is no smear and 5 is severe smear). The Control Ink had a smear rating of 5 (severe) whereas the Example Ink had a rating of 1 (no smear).

What is claimed is:

1. A process of making printed images comprising the step of ejecting droplets of ink from an ink jet printer onto a substrate, wherein said ink comprises:

(a) an aqueous carrier medium;
   (b) an aqueous carrier medium insoluble colorant;
   (c) branched polymer dispersant; and
   (d) an emulsion polymer additive comprising
      (1) monomers selected from the group consisting of acrylic monomers, methacrylic monomers; vinyl monomers; maleic acid; maleic anhydride; styrene; itaconic acid; N-vinyl pyrrolidone; acrylamides; and methacrylamides;

(2) a hydrophilic monomer of the general formula $CH_2=C(X)(Y')$ wherein X is H or $CH_3$; Y' is C(O)OH, $C(O)NR_2R_3$, $C(O)OR_4NR_2R_3$, $C(O)OR_5$, or salts thereof, $R_2$ and $R_3$ are independently H or a $C_1$ to $C_9$ alkyl, aryl, or alkylaryl; $R_4$ is a $C_1$ to $C_5$ alkyl diradical, and $R_5$ is a $C_1$ to $C_{20}$ alkyl diradical which may contain hydroxy or ether groups; and (3) a crosslinking monomer selected from the group consisting of ethylene glycol dimethacrylate and ethylene glycol triacrylate.

2. The process of claim 1 wherein the methacrylic monomers are selected from the group consisting of methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, ethoxytriethylene glycol methacrylate (ETEGMA), 2-ethoxyethyl methacrylate, methacrylonitrile, 2-trimethylsiloxyethyl methacrylate, glycidyl methacrylate(GMA), p-tolyl methacrylate, methacrylic acid (MAA), dimethylaminoethyl methacrylate (DMAEMA), diethylaminoethyl methacrylate, t-butylaminoethyl methacrylate and sorbyl methacrylate.

3. The process of claim 1 wherein the acrylic monomers are selected from the group consisting of methyl acrylate, ethyl acrylate, propyl acrylate, butyl acrylate, hexyl acrylate, 2-ethyhexyl acrylate, octyl acrylate, lauryl acrylate, stearyl acrylate, phenyl acrylate, hydroxyethyl acrylate, hydroxypropyl acrylate acrylonitrile, 2-trimethyl-siloxyethyl acrylate, glycidyl acrylate, p-tolyl acrylate, sorbyl acrylate, acrylic acid, dimethylaminoethyl acrylate and diethylaminoethyl acrylate.

4. The process of claim 1 wherein the branched polymer dispersant is a graft polymer.

5. The process of claim 1 wherein the aqueous carrier medium insoluble colorant is a pigment.

6. The process of claim 1 wherein the emulsion polymer additive is present in the amount of 0.01 to 20% solids by weight, based on the total weight of the ink composition.

7. The process of claim 1 wherein emulsion polymer additive is present in the amount of 0.01 to 5% solids by weight, based on the total weight of the ink composition.

8. The process of claim 1 wherein emulsion polymer additive is present in the amount of 5.1 to 20% solids by weight, based on the total weight of the ink composition.

9. The process of claim 1 wherein said aqueous carrier medium insoluble colorant is a pigment, wherein said branched polymer dispersant is a graft copolymer, and wherein the ink composition comprises approximately 0.1 to 8% pigment, 0.1 to 8% graft copolymer, 0.01 to 5% solids of the emulsion polymer additive and the remainder aqueous carrier medium, based upon the total weight of the ink composition.

10. The process of claim 1 wherein said aqueous carrier medium insoluble colorant is a pigment, wherein said branched polymer dispersant is a graft copolymer, and wherein the ink composition comprises approximately 0.1 to 8% pigment, 0.1 to 8% graft copolymer, 5.1 to 20% solids of the emulsion polymer additive and the remainder aqueous carrier medium, based upon the total weight of the ink composition.

11. The process of claim 1, wherein the ink is ejected with a thermal ink jet printer.

12. The process of claim 1, wherein the ink is ejected with a piezoelectric ink jet printer.

* * * * *